US008351858B2

(12) United States Patent
Lee et al.

(10) Patent No.: US 8,351,858 B2
(45) Date of Patent: Jan. 8, 2013

(54) APPARATUS AND METHOD FOR OBTAINING INFORMATION ON BLUETOOTH DEVICES IN A COMPUTING DEVICE USING BLUETOOTH

(75) Inventors: Yong-Ho Lee, Seongnam-si (KR); Sang-In Lee, Suwon-si (KR); Eun-Chul Kim, Suwon-si (KR); Kyoung-Han Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 414 days.

(21) Appl. No.: 12/506,387

(22) Filed: Jul. 21, 2009

(65) Prior Publication Data

US 2010/0120364 A1 May 13, 2010

(30) Foreign Application Priority Data

Nov. 10, 2008 (KR) ........................ 10-2008-0110987

(51) Int. Cl.
*H04B 7/00* (2006.01)
(52) U.S. Cl. ...................................... 455/41.2; 370/313

(58) Field of Classification Search ................ 455/41.2, 455/41.3, 557, 414.1, 411, 566, 456.3, 457, 455/458, 432.3, 420; 370/313, 338, 401, 370/449; 709/225, 204, 206
See application file for complete search history.

(56) References Cited

U.S. PATENT DOCUMENTS 7,715,796 B2 * 5/2010 Honda et al. ................. 455/41.2
2005/0088980 A1 * 4/2005 Olkkonen et al. ............ 370/255

* cited by examiner

*Primary Examiner* — Ping Hsieh
(74) *Attorney, Agent, or Firm* — Jefferson IP Law, LLP (57) ABSTRACT

An apparatus and method for obtaining information on Bluetooth devices in a computing device using Bluetooth are provided. The method includes, if an Inquiry Response (IR) packet is received as a response to an inquiry packet, obtaining information on a first Bluetooth device transmitting the IR packet and determining whether a supplementary response indication field is enabled and, if the supplementary response indication field is enabled, receiving an Extended Inquiry Response (EIR) packet, and obtaining information on at least one Bluetooth device other than the first Bluetooth device through the EIR packet.

19 Claims, 5 Drawing Sheets

APPARATUS AND METHOD FOR OBTAINING INFORMATION ON BLUETOOTH DEVICES IN A COMPUTING DEVICE USING BLUETOOTH

PRIORITY

The present application claims the benefit under 35 U.S.C. §119(a) of a Korean patent application filed in the Korean Intellectual Property Office on Nov. 10, 2008 and assigned Serial No. 10-2008-0110987, the entire disclosure of which is hereby incorporated by reference.

BACKGROUND OF THE INVENTION

1. Field of the Invention

The present invention relates to a computing device using Bluetooth. More particularly, the present invention relates to an apparatus and method for obtaining information on Bluetooth devices in a computing device using Bluetooth.

2. Description of the Related Art

Bluetooth, a technology for performing local wireless communication, realizes communication between devices existing in a short range using an Industrial Scientific Medical (ISM) band of 2.4 GHz. For example, a portable terminal can enable various services such as a wireless headset, printing, file transmission, etc. using the Bluetooth technology.

To establish a connection using Bluetooth, a process of searching for another party device in a first device is performed. This is called an inquiry process. That is, the first device, operating as a master, has to perform the inquiry process. The inquiry process is subdivided into an inquiry for obtaining a Bluetooth Device ADDRess (BDADDR) of the other party device and a name request (name_req) inquiry for obtaining a name of the other party device.

Upon beginning the inquiry process, a master device does not have information on devices operable as slaves. In other words, the master device cannot be aware if any slave device waits to receive any frequency channel. Thus, the master device repeatedly transmits an inquiry packet, which is a type of beacon, in every slot. The inquiry packet transmission includes changing a channel within 32 frequency channels set for an inquiry purpose. Thus, the slave device selects one of the 32 frequency channels and identifies reception or non-reception of the inquiry packet during a specific duration of time. If the inquiry packet is not received during the duration of time, the slave device changes a channel and then, again identifies the reception or non-reception of the inquiry packet. As a result of repeated attempts, if a transmission frequency channel of the master device is matched at random with a reception frequency channel of the slave device, the slave device receives the inquiry packet.

As described above, in order for an inquiry packet of a master device to be received by a slave device, an attempt to transmit/receive the inquiry packet has to be repeatedly carried out until the transmission frequency channel is matched with a reception frequency channel. That is, to ensure successful reception of the inquiry packet, a constant period of time has to be guaranteed. Accordingly, there is a problem that time taken to search for slave devices becomes very long. Further, if a search time is limited, there is a problem that, though a plurality of slave devices exists around a master device, only some of the slave devices are searched for because of the limited amount of search time.

SUMMARY OF THE INVENTION

An aspect of the present invention is to address at least the above problems and/or disadvantages and to provide at least the advantages below. Accordingly, an aspect of the present invention is to provide an apparatus and method for reducing a time taken to search for slave devices in a computing device using Bluetooth.

Another aspect of the present invention is to provide an apparatus and method for searching for more slave devices within a limited time in a computing device using Bluetooth.

A further aspect of the present invention is to provide an apparatus and method for obtaining information on a slave device paired with a different slave device in a computing device using Bluetooth.

The above aspects are addressed by providing an apparatus and method for obtaining information on Bluetooth devices in a computing device using Bluetooth.

According to an aspect of the present invention, a method for obtaining information on peripheral Bluetooth devices in a computing device using Bluetooth is provided. The method includes, if an Inquiry Response (IR) packet is received as a response to an inquiry packet, obtaining information on a first Bluetooth device transmitting the IR packet and determining whether a supplementary response indication field is enabled, if the supplementary response indication field is enabled, receiving an Extended Inquiry Response (EIR) packet, and obtaining information on at least one Bluetooth device other than the first Bluetooth device through the EIR packet.

According to another aspect of the present invention, a method for providing information on Bluetooth devices in a computing device using Bluetooth is provided. The method includes receiving an inquiry packet from a master device, and generating and transmitting an Inquiry Response (IR) packet that comprises information on the computing device and a supplementary response indication field.

According to a further aspect of the present invention, a computing device apparatus using Bluetooth is provided. The apparatus includes a processor and a communication unit. If an Inquiry Response (IR) packet is received as a response to an inquiry packet, the processor obtains information on a first Bluetooth device transmitting the IR packet and determining if a supplementary response indication field is enabled. If the supplementary response indication field is enabled, the communication unit receives an Extended Inquiry Response (EIR) packet. The processor obtains information on at least one Bluetooth device other than the first Bluetooth device through the EIR packet.

According to a yet another aspect of the present invention, a Bluetooth device apparatus in a computing device using Bluetooth is provided. The apparatus includes a communication unit and a processor. The communication unit receives an inquiry packet from a master device. The processor generates an Inquiry Response (IR) packet that comprises information on the computing device and a supplementary response indication field, and may generate an Extended Inquiry Response (EIR) packet that comprises information on at least one Bluetooth device other than the computing device.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An exemplary technology for reducing the time taken to search for slave devices in a computing device using Bluetooth according to the present invention is described below. In the following description, the term 'computing device' signifies any device that can have a Bluetooth function, such as a cellular phone, a Personal Communication System (PCS) phone, a Personal Data Assistant (PDA) phone, an International Mobile Telecommunication (IMT)-2000 terminal, a lap-top computer, a desk-top computer, etc.

The following description provides an overview of a process for obtaining information on slave devices according to an exemplary embodiment of the present invention. A first master device succeeding in inquiry obtains information on a slave device. Next, a pairing process between the first master device and the slave device is performed. After completion of the pairing process, the first master device connects with the slave device and performs Bluetooth communication. Then, although the communication is ended, the information on the slave device (i.e., parameters of a name, Bluetooth Device ADDRess (BDADDR), Class Of Device (COD), etc.) is stored and kept in the first master device. Thus, after the Bluetooth communication is ended, if the first master device responds as a slave device to an inquiry of a second master device, the first master device provides the second master device with information on formerly paired slave devices. Accordingly, through a single inquiry, the second master device obtains information on a plurality of slave devices.

The aforementioned process of obtaining the information on the slave devices is described below in more detail.

Figure 1A:
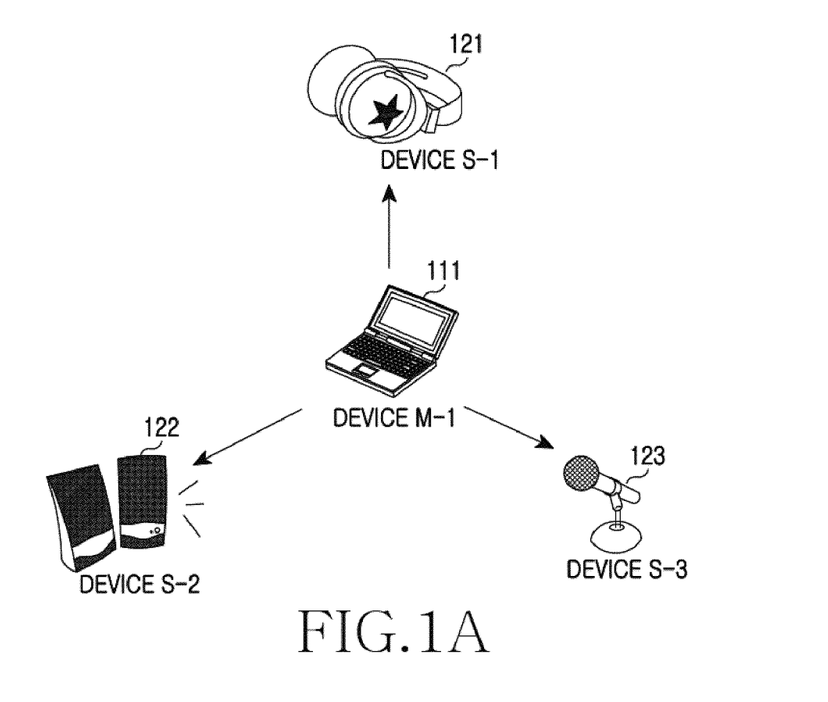
FIGS. 1A and 1B are diagrams illustrating a piconet composed of Bluetooth devices according to exemplary embodiments of the present invention.
Figure 1B:
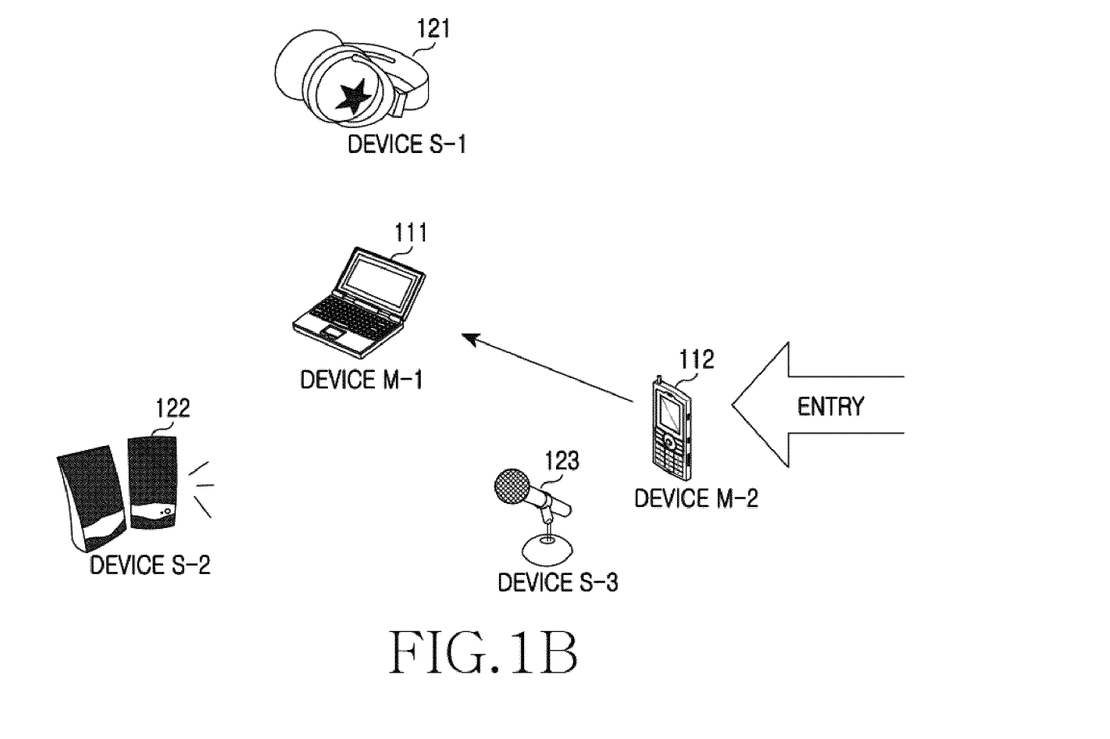

FIGS. 1A and 1B are diagrams illustrating a piconet composed of Bluetooth devices according to exemplary embodiments of the present invention.

As illustrated in FIG. 1A, devices having a Bluetooth function form a piconet. A device M-1 111 operates as a master device and searches peripheral Bluetooth devices. That is, the device M-1 111 transmits an inquiry packet by changing a channel within 32 frequency channels set for an inquiry purpose. A device S-1 121, a device S-2 122, and a device S-3 123 are positioned around the device M-1 111. The device S-1 121, the device S-2 122, and the device S-3 123 operate as slave devices, and monitor reception or non-reception of the inquiry packet within the 32 frequency channels. Thus, when a transmission frequency channel of the device M-1 111 is matched with a reception frequency channel of the device S-1 121, the device S-2 122, or the device S-3 123, the inquiry packet is received by the device S-1 121, the device S-2 122, or the device S-3 123, respectively. In reply to this, the device S-1 121, the device S-2 122, or the device S-3 123 transmits an Inquiry Response (IR) packet including information of a COD, a BDADDR, a clock, etc., to the device M-1 111. Next, through a name request (name_req) process, the device M-1 111 obtains a name of the device S-1 121, the device S-2 122, or the device S-3 123, performs pairing with the device S-1 121, the device S-2 122, or the device S-3 123, and then performs Bluetooth communication. In the illustrated example, it is assumed that the device M-1 111 performs Bluetooth communication with all of the devices S-1 121, S-2 122, and S-3 123 through the aforementioned procedures. As part of the Bluetooth communication and according to an exemplary embodiment of the present invention, the device M-1 111 stores and keeps information on the paired devices S-1 121, S-2 122, and S-3 123.

After the device M-1 111 ends the Bluetooth communication with the device S-1 121, the device S-2 122, and the device S-3 123, as illustrated in FIG. 1B, a device M-2 112 newly enters the piconet. The entry of the device M-2 112 into the piconet is achieved through a physical movement, through a transition from a power off state to a power on state, or by different various reasons. As a master device, the device M-2 112 entering the piconet intends to perform Bluetooth communication. Thus, the device M-2 112 transmits an inquiry packet by changing a channel within 32 frequency channels set for an inquiry purpose. The device M-1 111 receives, as a slave device, the inquiry packet from the device M-2 112. In reply, the device M-1 111 transmits an IR packet including a COD, a BDADDR, a clock, etc., to the device M-2 112.

Figure 2:
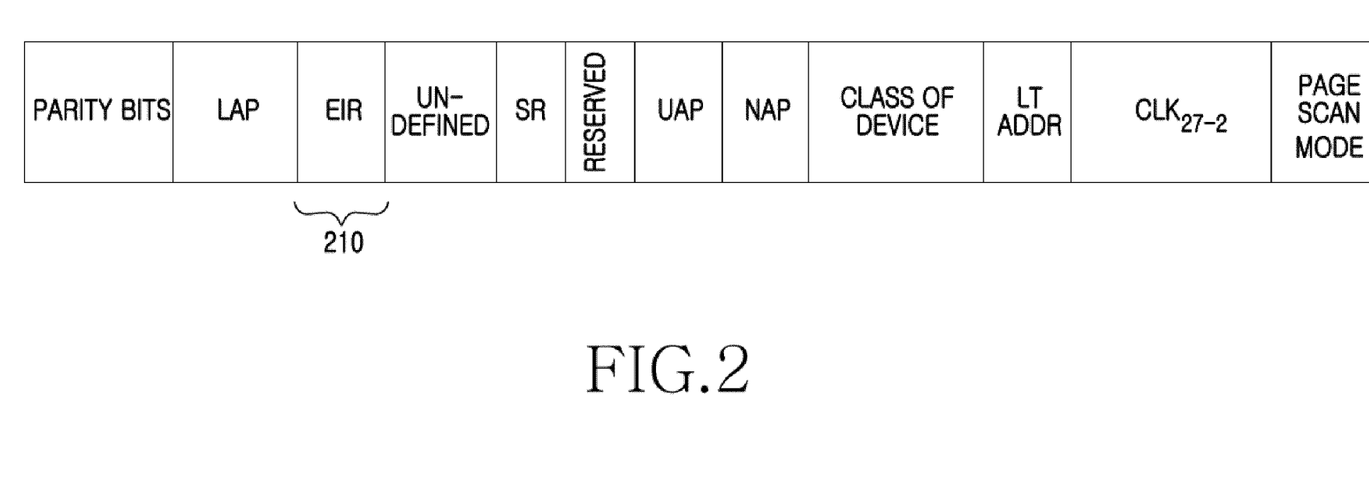
FIG. 2 is a diagram illustrating a structure of an Inquiry Response (IR) packet exchanged between Bluetooth devices according to an exemplary embodiment of the present invention.

Again, the device M-1 111 has stored and kept information on the formerly paired device S-1 121, device S-2 122, and device S-3 123. The device M-1 111 sets, to '1', a field for indicating that a supplementary response packet (i.e., an Extended Inquiry Response (EIR) packet) exists within the IR packet. For example, if the IR packet is constructed as illustrated in FIG. 2, the device M-1 111 sets an EIR field 210 to '1'. With the EIR field 210 set to '1', the device M-2 112 recognizes that the EIR packet will be received, and the device M-1 111 transmits the EIR packet including the information on the device S-1 121, the device S-2 122, and the device S-3 123. Accordingly, the device M-2 112 obtains the information on the device S-1 121, the device S-2 122, and the device S-3 123 through the EIR packet, with no additional inquiry process.

Below, an exemplary operation and construction of a computing device for exchanging information on slave devices as described above according to exemplary embodiments of the present invention are described in detail with reference to the accompanying drawings.

Figure 3:
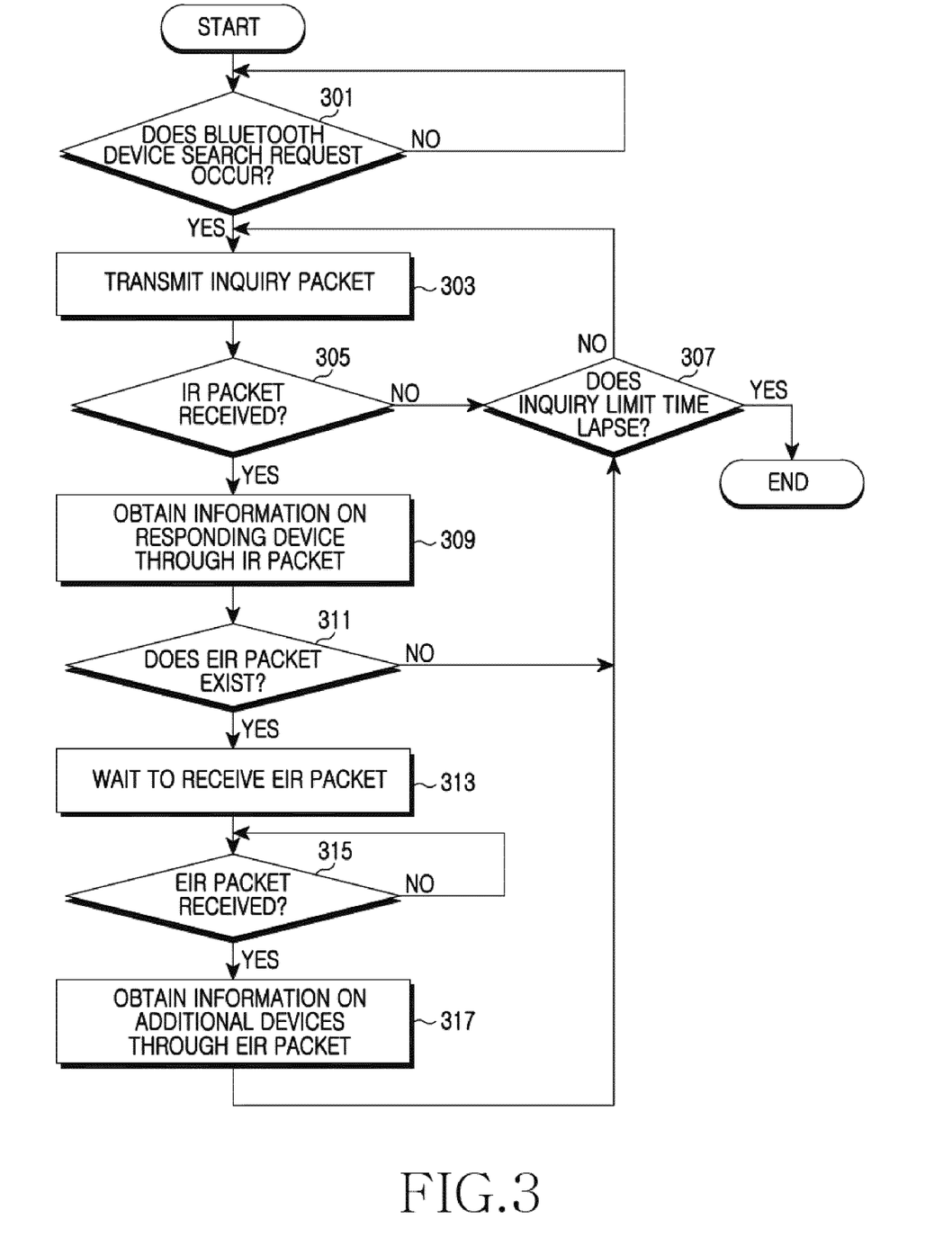
FIG. 3 is a flow diagram illustrating a procedure of, as a master device, obtaining information on peripheral Bluetooth devices in a computing device using Bluetooth according to an exemplary embodiment of the present invention.

FIG. 3 is a flow diagram illustrating a procedure of, as a master device, obtaining information on peripheral Bluetooth devices in a computing device using Bluetooth according to an exemplary embodiment of the present invention.

Referring to FIG. 3, in step 301, the computing device determines whether a Bluetooth device search request occurs. In other words, the computing device determines whether a search for Bluetooth devices is requested from a user through a user's manipulation.

If the Bluetooth device search request occurs, the computing device proceeds to step 303 and transmits an inquiry packet. That is, the computing device continuously transmits the inquiry packet while changing a transmission channel in a defined order within a plurality of frequency channels set for an inquiry purpose.

Then, the computing device proceeds to step 305 and determines whether an IR packet is received. The IR packet, which is a response of a peripheral Bluetooth device receiving the inquiry packet, includes information such as a COD, a BDADDR, a clock, etc. of the peripheral Bluetooth device sending the IR packet. For example, the IR packet is constructed as in FIG. 2.

If the IR packet is not received, the computing device proceeds to step 307 and determines whether an inquiry time limit lapses. That is, an operation of searching for peripheral Bluetooth devices through inquiry packet transmission is performed during a preset time limit. Thus, if the time limit lapses, the computing device terminates the procedure and, if the time limit does not lapse, returns to step 303.

On the other hand, if it is determined that the IR packet is received in step 305, the computing device proceeds to step 309 and obtains information on a device responding to the inquiry (i.e., a device transmitting the IR packet), through the IR packet. In other words, the computing device obtains information such as a COD, a BDADDR, a clock, etc. of the responding device included within the IR packet.

In step 311, the computing device determines whether a supplementary response indication field within the IR packet is enabled. The supplementary response indication field is a field for indicating transmission or non-transmission of a separate packet including supplementary information related to an inquiry. For example, in a structure of an IR packet as illustrated in FIG. 2, the EIR field 210 is used as the supplementary response indication field. If the supplementary response indication field is disabled, the computing device returns to step 307.

On the other hand, if it is determined that the supplementary response indication field is enabled in step 311, the computing device proceeds to step 313 and waits to receive an EIR packet. In other words, the computing device recognizes that a separate packet including supplementary information is transmitted by identifying that the supplementary response indication field is enabled, and waits to receive the separate packet, i.e., the EIR packet. That is, the computing device monitors packets that are received through a channel corresponding to a packet type of the EIR packet.

In step 315, the computing device determines whether the EIR packet is received. At this time, although not shown, the computing device continuously transmits an inquiry packet and, if an IR packet is received from a different Bluetooth device, performs an operation corresponding to the IR packet reception.

If it is determined that the EIR packet is received in step 315, the computing device proceeds to step 317 and obtains information on additional devices through the EIR packet. In other words, the computing device obtains information on Bluetooth devices formerly paired with the responding device. That is, the EIR packet includes information of CODs, BDADDRs, clocks, etc. on Bluetooth devices that were formerly paired with the device responding to the inquiry. By this process, the computing device obtains information on various other Bluetooth devices without necessarily having received a direct response from the other Bluetooth devices. After that, the computing device returns to step 307.

Figure 4:
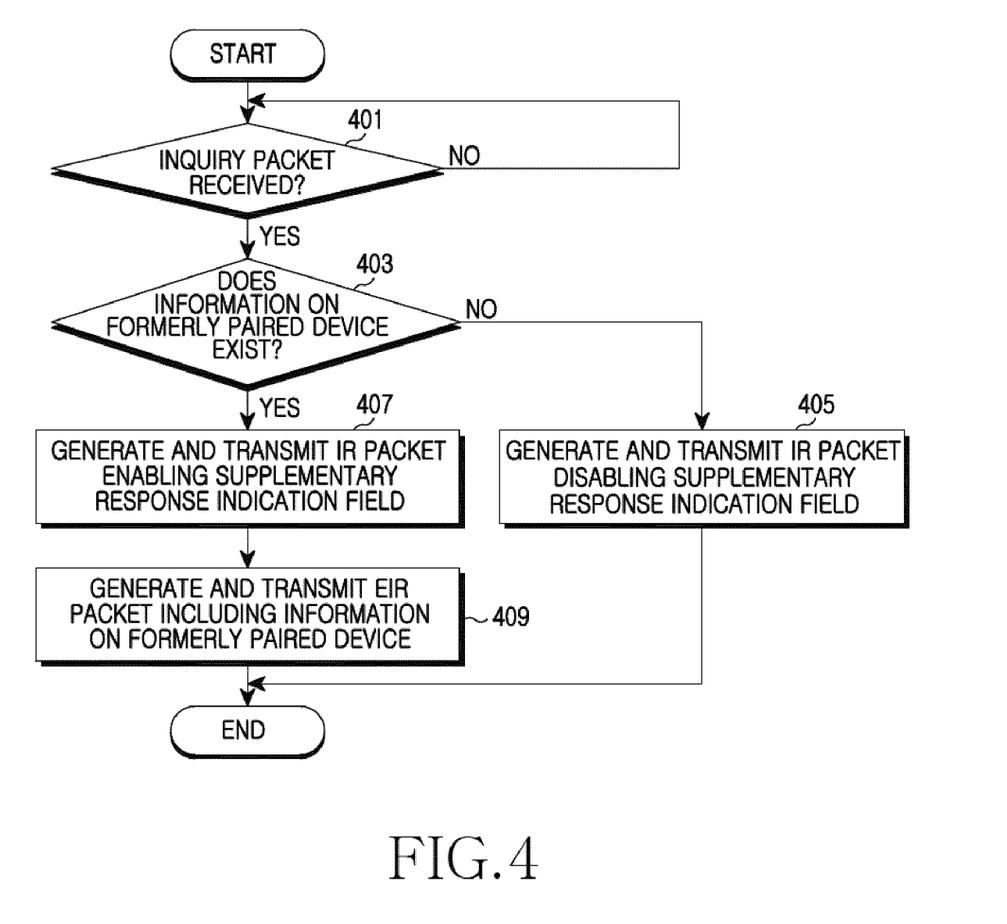
FIG. 4 is a flow diagram illustrating a procedure of, as a slave device, obtaining information on peripheral Bluetooth devices in a computing device using Bluetooth according to an exemplary embodiment of the present invention.

FIG. 4 is a flow diagram illustrating a procedure of, as a slave device, obtaining information on peripheral Bluetooth devices in a computing device using Bluetooth according to an exemplary embodiment of the present invention.

Referring to FIG. 4, in step 401, the computing device determines whether an inquiry packet is received. That is, the computing device monitors reception of an inquiry packet by changing a channel in a defined order within a plurality of frequency channels set for an inquiry purpose.

If the inquiry packet is received, the computing device proceeds to step 403 and determines whether information on formerly paired Bluetooth devices exists. In other words, the computing device determines whether information such as CODs, BDADDRs, clocks, etc. on formerly paired Bluetooth devices is stored therein.

If the information on the formerly paired Bluetooth devices does not exist, in step 405, the computing device generates an IR packet disabling a supplementary response indication field and transmits the IR packet. The supplementary response indication field is a field for indicating transmission or non-transmission of a separate packet including supplementary information related to an inquiry. For example, in a structure of an IR packet as in FIG. 2, the EIR field 210 is used as the supplementary response indication field. That is, the computing device transmits the IR packet, including its own COD, BDADDR, and clock, etc., as well as a disabled supplementary response indication field.

On the other hand, if it is determined in step 403 that the information on the formerly paired Bluetooth devices exists, in step 407, the computing device generates an IR packet enabling the supplementary response indication field and transmits the IR packet. That is, in order to inform, through the IR packet, a master device of an intention to transmit the information on the formerly paired Bluetooth devices using a separate packet, the computing device generates the IR packet enabling the supplementary response indication field. More specifically, the computing device transmits the IR packet including its own COD, BDADDR, and clock, etc., as well as an enabled supplementary response indication field.

In step 409, the computing device generates and transmits an EIR packet including the information on the formerly paired Bluetooth devices. In other words, the computing device transmits the EIR packet including the information of CODs, BDADDRs, clocks, etc. on the formerly paired Bluetooth devices, to the master device.

Figure 5:
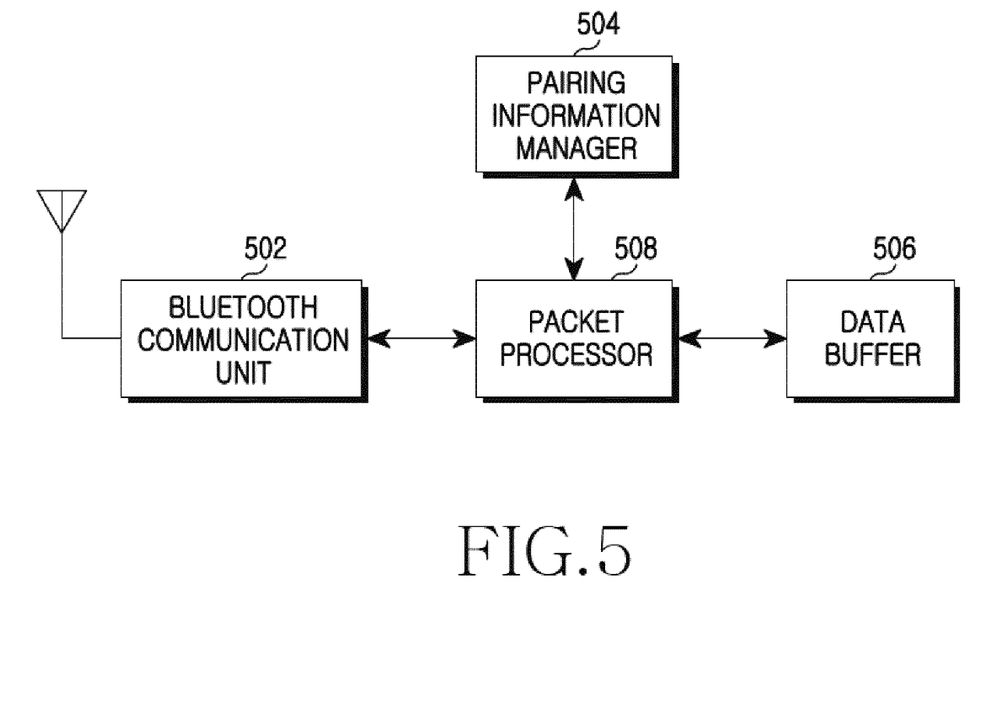
FIG. 5 is a block diagram illustrating a construction of a computing device using Bluetooth according to an exemplary embodiment of the present invention.

FIG. 5 is a block diagram illustrating a construction of a computing device using Bluetooth according to an exemplary embodiment of the present invention.

As illustrated in FIG. 5, the computing device includes a Bluetooth communication unit 502, a pairing information manager 504, a data buffer 506, and a packet processor 508.

The Bluetooth communication unit 502 provides an interface for performing communication with a Bluetooth device. That is, the Bluetooth communication unit 502 performs a mutual conversion between a packet bit stream and a transmission/reception signal in compliance with the Bluetooth standard. For example, if transmitting a signal, the Bluetooth communication unit 502 converts a bit stream of a packet provided from the packet processor 508 into a physical signal, and transmits the physical signal through an antenna according to a scheme corresponding to a packet type. That is, if the computing device searches for peripheral Bluetooth devices as a master device, the Bluetooth communication unit 502 transmits an inquiry packet by changing a channel in a defined order within a plurality of frequency channels set for an inquiry purpose. On the other hand, if the computing device operates as a slave device, the Bluetooth communication unit 502 attempts to receive an inquiry packet by changing a channel in a defined order within a plurality of frequency channels set for an inquiry purpose.

The pairing information manager 504 stores and manages information on paired Bluetooth devices. That is, if pairing is achieved, the pairing information manager 504 stores information such as a COD, a BDADDR, a clock, etc. of a paired device, and provides the stored information on the paired device according to a request of the packet processor 508. For example, if the computing device operates as a slave device and an inquiry packet is received from a master device, the pairing information manager 504 provides stored information on formerly paired Bluetooth devices to the packet processor 508. The data buffer 506 temporarily stores data exchanged through Bluetooth communication.

The packet processor 508 processes packets exchanged through Bluetooth communication. For example, the packet processor 508 generates a data packet including data provided from the data buffer 506, and provides the generated data packet to the Bluetooth communication unit 502. Also, the packet processor 508 extracts data included in a received data packet, and provides the extracted data to the data buffer 506. The packet processor 508 generates and analyzes a control packet for an inquiry process. An operation of the packet processor 508 for the inquiry process is described below by considering the two cases of operating as a master device and operating as a slave device.

If a Bluetooth device search request occurs while the computing device operates as a master device, the packet processor 508 generates an inquiry packet, and provides the inquiry packet to the Bluetooth communication unit 502. If an IR packet is received as a response to the inquiry packet, the packet processor 508 obtains information on responding devices, which is included in the IR packet. At this time, if the IR packet includes an enabled supplementary response indication field, the packet processor 508 controls the Bluetooth communication unit 502 to receive an EIR packet. The supplementary response indication field is a field for indicating transmission or non-transmission of a separate packet including supplementary information related to an inquiry. For example, in a structure of an IR packet as illustrated in FIG. 2, the EIR field 210 is used as the supplementary response indication field. Thus, if the EIR packet is received, the packet processor 508 obtains information on Bluetooth devices formerly paired with the responding device, which is included in the EIR packet.

If an inquiry packet is received while the computing device operates as a slave device, the packet processor 508 generates an IR packet including information such as a COD, a BDADDR, a clock, etc. of the computing device, and provides the IR packet to the Bluetooth communication unit 502. More particularly, when generating the IR packet, the packet processor 508 generates an IR packet including an enabled supplementary response indication field if information on formerly paired Bluetooth devices is stored in the pairing information manager 504. The packet processor 508 requests the pairing information manager 504 for the information on the formerly paired Bluetooth devices, generates an EIR packet including the information on the formerly paired Bluetooth devices, and provides the EIR packet to the Bluetooth communication unit 502. On the other hand, when generating the IR packet, the packet processor 508 generates an IR packet including a disabled supplementary response indication field if the information on the formerly paired Bluetooth devices is not stored in the pairing information manager 504.

As described above, according to an exemplary embodiment of the present invention, a master device can obtain information on more Bluetooth devices within a limited time by providing information on formerly paired Bluetooth devices through an EIR packet in a computing device using Bluetooth.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for obtaining information on peripheral Bluetooth devices in a computing device using Bluetooth, the method comprising:
    if an Inquiry Response (IR) packet is received as a response to an inquiry packet, obtaining information on a first Bluetooth device transmitting the IR packet and determining whether a supplementary response indication field located within the IR packet is enabled;
    if the supplementary response indication field is enabled, waiting to receive an Extended Inquiry Response (EIR) packet; and
    obtaining, through the EIR packet that is sent from the first Bluetooth device, information on at least one Bluetooth device other than the first Bluetooth device,
    wherein the supplementary response indication field located within the IR packet is enabled if it is determined that the information on the at least one Bluetooth device exists in the first Bluetooth device within the EIR packet.

2. The method of claim 1, wherein the information on the first Bluetooth device comprises at least one of a Class Of Device (COD), Bluetooth Device ADDRess (BDADDR), and clock of the first Bluetooth device.

3. The method of claim 1, wherein the at least one Bluetooth device comprises a Bluetooth device formerly paired with the first Bluetooth device.

4. The method of claim 1, wherein if the supplementary response indication field is enabled, the EIR packet is received at a separate time from receipt of the IR packet.

5. A method for providing information on Bluetooth devices in a computing device using Bluetooth, the method comprising:
- receiving an inquiry packet from a master device;
- generating and transmitting, from the computing device, an Inquiry Response (IR) packet that comprises information on the computing device and a supplementary response indication field; and
- generating and transmitting, from the computing device, an Extended Inquiry Response (EIR) packet that comprises information on at least one Bluetooth device other than the computing device, if it is determined that the information on the at least one Bluetooth device exists in the computing device.

6. The method of claim 5, wherein the information on the computing device comprises at least one of a Class Of Device (COD), Bluetooth Device ADDRess (BDADDR), and clock of the computing device.

7. The method of claim 5, wherein the at least one Bluetooth device comprises a Bluetooth device formerly paired with the computing device.

8. The method of claim 7, further comprising:
- after receipt of the inquiry packet, determining whether information on the at least one Bluetooth device formerly paired is stored,
- wherein the generating and the transmitting of the IR packet comprises, if the information on the at least one Bluetooth device formerly paired is stored, generating the IR packet comprising an enabled supplementary response indication field.

9. The method of claim 8, wherein, if the information on the at least one Bluetooth device is not stored, generating the IR packet comprising a disabled supplementary response indication field.

10. The method of claim 5, wherein the IR packet is transmitted at a separate time from transmission of the EIR packet.

11. A computing apparatus using Bluetooth, the device comprising:
- a processor for, if an Inquiry Response (IR) packet is received as a response to an inquiry packet, obtaining information on a first Bluetooth device transmitting the IR packet and determining if a supplementary response indication field located within the IR packet is enabled; and
- a communication unit for, if the supplementary response indication field is enabled, waiting to receive an Extended Inquiry Response (EIR) packet,
- wherein the processor obtains, through the EIR packet that is sent from the first Bluetooth device, information on at least one Bluetooth device other than the first Bluetooth device, and
- wherein the supplementary response indication field located within the IR packet is enabled if it is determined that the information on the at least one Bluetooth device exists in the first Bluetooth device within the EIR packet.

12. The apparatus of claim 11, wherein the information on the first Bluetooth device comprises at least one of a Class Of Device (COD), Bluetooth Device ADDRess (BDADDR), and clock of the first Bluetooth device.

13. The apparatus of claim 11, wherein the at least one Bluetooth device comprises a Bluetooth device formerly paired with the first Bluetooth device.

14. The apparatus of claim 11, wherein if the supplementary response indication field is enabled, the EIR packet is received at a separate time from receipt of the IR packet.

15. A Bluetooth apparatus in a computing device using Bluetooth, the apparatus comprising:
- a communication unit for receiving an inquiry packet from a master device; and
- a processor for generating an Inquiry Response (IR) packet that comprises information on the computing device and a supplementary response indication field, and for generating an Extended Inquiry Response (EIR) packet that comprises information on at least one Bluetooth device other than the computing device, if it is determined that the information on the at least one Bluetooth device other than the computing device exists within the computing device,
- wherein the communication unit transmits the IR packet and the EIR packet.

16. The apparatus of claim 15, wherein the information on the computing device comprises at least one of a Class Of Device (COD), Bluetooth Device ADDRess (BDADDR), and clock of the computing device.

17. The apparatus of claim 15, wherein the at least one Bluetooth device comprises a Bluetooth device formerly paired with the computing device.

18. The apparatus of claim 17, wherein, if the inquiry packet is received, the processor determines whether information on the at least one Bluetooth device formerly paired is stored and, if the information on the at least one Bluetooth device formerly paired is stored, generates the IR packet comprising an enabled supplementary response indication field.

19. The apparatus of claim 18, wherein, if the information on the at least one Bluetooth device formerly paired is not stored, the processor generates the IR packet comprising a disabled supplementary response indication field.

* * * * *